(12) United States Patent
Yang et al.

(10) Patent No.: US 8,787,682 B2
(45) Date of Patent: Jul. 22, 2014

(54) FAST IMAGE CLASSIFICATION BY VOCABULARY TREE BASED IMAGE RETRIEVAL

(75) Inventors: Ming Yang, Sunnyvale, CA (US);
Xiaoyu Wang, Columbia, MO (US);
Yuanqing Lin, Sunnyvale, CA (US);
Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 466 days.

(21) Appl. No.: 13/339,240

(22) Filed: Dec. 28, 2011

(65) Prior Publication Data

US 2012/0243789 A1     Sep. 27, 2012

Related U.S. Application Data

(60) Provisional application No. 61/466,051, filed on Mar. 22, 2011.

(51) Int. Cl.
*G06K 9/62*     (2006.01)
*G06K 9/46*     (2006.01)

(52) U.S. Cl.
CPC ...... *G06K 9/4676* (2013.01); *G06K 2009/4695* (2013.01)
USPC ............ 382/224; 382/225; 382/226; 382/272

(58) Field of Classification Search
CPC .................... G06K 9/4676; G06K 2009/4695; G06K 9/6267–9/6293
USPC ......... 382/159, 160, 165, 169, 170, 181, 224, 382/225, 226, 227, 228; 700/47, 50; 706/15, 19, 20, 22, 41
See application file for complete search history.

(56) References Cited

U.S. PATENT DOCUMENTS

| 2007/0098266 | A1* | 5/2007 | Chiu et al. ..................... 382/224 |
| 2010/0177956 | A1* | 7/2010 | Cooper et al. ................ 382/159 |
| 2012/0269436 | A1* | 10/2012 | Mensink et al. .............. 382/180 |

OTHER PUBLICATIONS

David Nister and Henrik Stewenius, Scalable Recognition with a Vocabulary Tree, CVPR 2006.
Kai Yu and Tong Zhang and Yihong Gong, Nonlinear Learning using Local Coordinate Coding, NIPS 2009.
Jianchao Yang and Kai Yu and Yihong Gong and Thomas Huang, Linear Spatial Pyramid Matching Using Sparse Coding for Image Classification, CVPR 2009.
Xi Zhou and Kai Yu and Tong Zhang and Thomas Huang, Image Classification using Super-Vector Coding of Local Image Descriptors, ECCV 2010.

* cited by examiner

*Primary Examiner* — Brian Le
(74) *Attorney, Agent, or Firm* — Joseph Kolodka

(57) ABSTRACT

Systems and methods are disclosed to categorize images by detecting local features for each image; applying a tree structure to index local features in the images; and extracting a rank list of candidate images with category tags based on a tree indexing structure to estimate a label of a query image.

18 Claims, 3 Drawing Sheets

FAST IMAGE CLASSIFICATION BY VOCABULARY TREE BASED IMAGE RETRIEVAL

The present application claims priority to provisional application Ser. No. 61/466,051 filed Mar. 22, 2011, the content of which is incorporated by reference.

BACKGROUND

Image category classification or recognition is enabling many emerging multimedia applications, e.g., photo album management, mobile visual search, and image tagging as a service. The most popular paradigm of image classification is based on bag-of-words (BoW), which generally involves four steps: local descriptor extraction, descriptor coding, pooling, and classification.

In conventional BoW process, sparse or dense local invariant descriptors are detected and coded by a coding process such as sparse coding, local coordinate coding (LCC), or super-vector coding. Then, coding vectors are pooled to construct image-level representations, which are fed to classifiers such as linear SVM classifiers to output category predictions. The coding methods code BoW histograms into high dimensional feature spaces, e.g., using codebooks with 8K to 16K visual words, to enhance the image feature's discriminative power. However, these approaches generally induce intensive computations that are costly when processing a large number of images. For example, some existing approaches employ advanced coding algorithms to generate image-level representation from local invariant features and apply certain classifiers, which are generally computationally intensive. Other state-of-the-art image classification methods often involve heavy computation on both feature extraction and classifier training.

SUMMARY

In one aspect, systems and methods are disclosed to categorize images by detecting local features for each image; applying a tree structure to index local features in the images; and extracting a rank list of candidate images with category tags based on the tree indexing structure to estimate a label of a query image.

Implementations of the above aspect can include one or more of the following. The system can apply a weighted voting according to a rank. The system includes performing vocabulary tree based image retrieval in a large-scale image category classifier. The vocabulary tree based image retrieval can include determining image content based nearest neighbor searching or alternatively can include classifying with a linear support vector machine (SVM). The system can generate inverted indices representing local invariant feature of an image. A sematic category classification can be done to generate a semantic label for the query image. The system cab determine a category of the query image C(q) by $$C(q) = \underset{c=1}{\overset{N}{\operatorname{argmax}}} \sum_{i=1}^{K} \frac{1(C(I_i) = c)}{\sqrt{i}},$$

where retrieved top K candidate images $I_i$ are sorted according to matching score $s_i$ in descending order $\{I_i, s_i\}_1^K$, $s_i > s_j$, $\forall i < j$ and where $C(I_i)$ is an image category index of $I_i$. The system can rank scores of all categories to train a multi-class linear SVM. Additionally, the system can concatenate ranking scores build a feature $x \in R^N$ for an image q:

$$x = \left\{ \sum_{i=1}^{K} \frac{1(C(I_i) = c)}{\sqrt{i}} \right\}_{c=1}^{N}.$$

The image category classification takes advantage of fast image retrieval techniques and a large tagged image database. As these retrieved images have category labels, the system can easily generate the tag of the query by weighted voting, which is essentially an approximate nearest neighbor classifier. Or we can train a supervised linear SVM classifier from these sparse BoW histograms.

The major advantage of the preferred embodiment is reduced computation cost and high classification speed. The image classification by retrieval method is simple, efficient, effective, and easy to be implemented and repeated, which demonstrates great potential for very large scale image classification tasks in emerging applications such as image tagging and recommendation. The computational efficiency is crucial for applications providing large-scale image classification as a service.

BRIEF DESCRIPTION OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

DESCRIPTION

Figure 1:
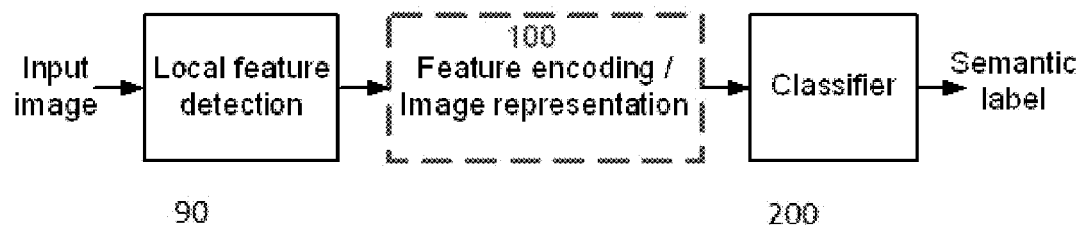
FIG. 1 shows an exemplary bag-of-words (BoW) system for image classification.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

FIG. 1 shows an exemplary bag-of-words (BoW) system for image classification. The BoW image classification involves three operations: local feature detection 90, feature encoding 100, and classification 200. First, sparse or dense local invariant features are detected and pooled into a single or a spatial pyramid of BoW histograms. Then, a vocabulary tree based image retrieval technique is applied to build a very sparse BoW histogram in a high dimensional space for a query image to be classified with several millions of visual words is applied to construct image-level representations (100). The output of local feature encoder 100 is fed to classifiers 200 such as linear SVM classifiers to output category tags.

The system of FIG. 1 takes advantage of fast image retrieval techniques and a large tagged image database. Specifically, the system employs the vocabulary tree based image retrieval technique to build a very sparse BoW histogram in a high dimensional space for a query image to be classified with several millions of visual words. This sparse BoW histogram is utilized to retrieve similar images efficiently, e.g., within half a second from a databases including over one million images. As these retrieved images have category tags, the system can easily generate the tag of the query by weighted voting, which is essentially an approximate nearest neighbor classifier. Further the system can train a linear SVM classifier based on the ranking of categories of retrieved images. In one test, image classification by retrieval method is done on the ImageNet Challenge task to classify 150K testing images to 1000 categories. The weighted voting scheme and the SVM classifier achieve top-5 hit rates 31.6% and 38.2% respectively, providing a strong performance given the simplicity of both feature extraction and classification.

The vocabulary tree based image retrieval to image category classification is highly appealing due to its efficiency. The system can also explore several different ways to leverage the retrieval outputs and their advantages are analyzed respectively. The computational efficiency is crucial for applications when providing large-scale image classification as a service.

Figure 2:
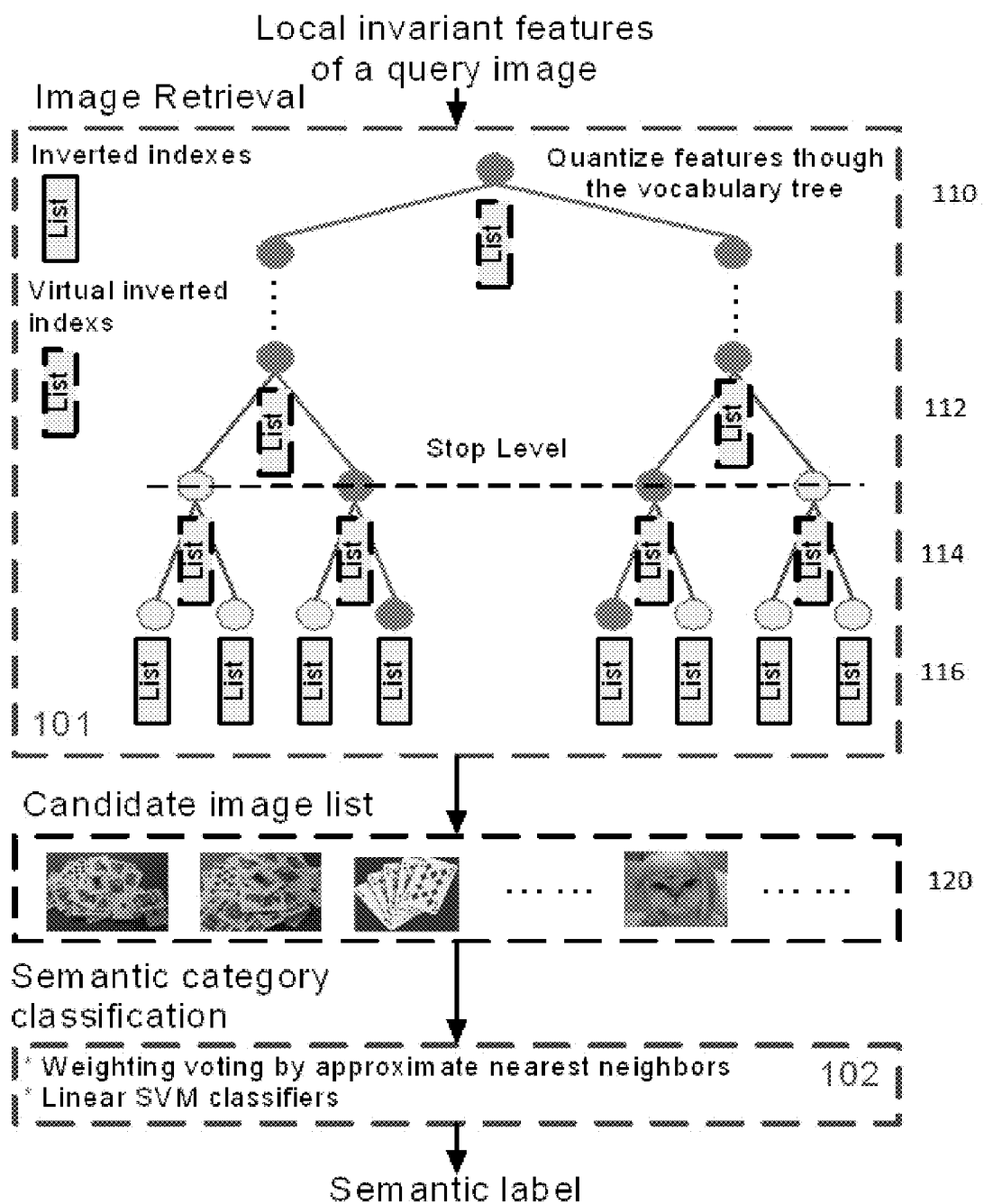
FIG. 2 shows an exemplary vocabulary tree based image retrieval technique used to build a highly sparse BoW histogram of a query image in a high dimensional space.
Figure 3:
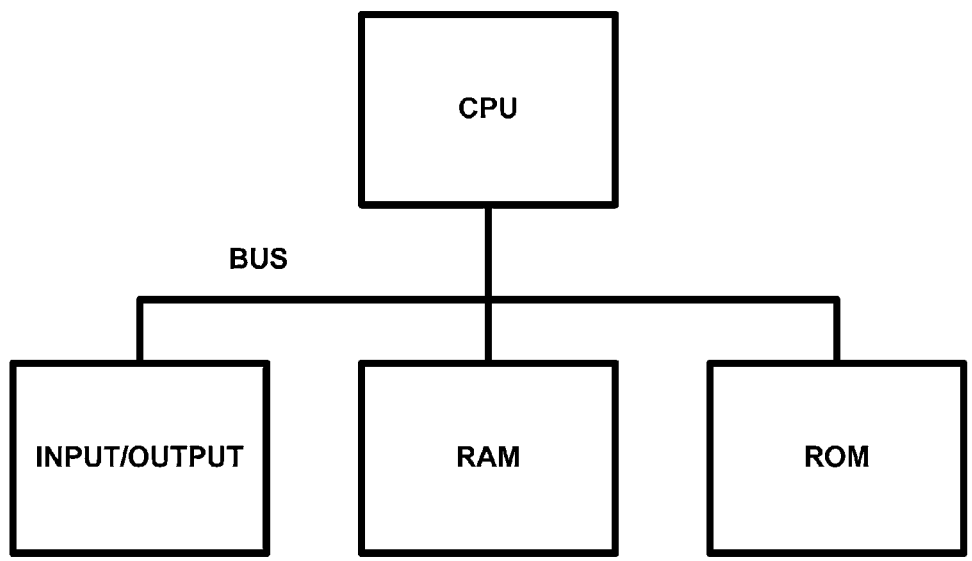
FIG. 3 shows an exemplary system for image classification.

FIG. 2 shows an exemplary vocabulary tree based image retrieval technique used to build a highly sparse BoW histogram of a query image in a high dimensional space, conceptually with several millions of visual words in 101. In the embodiment of FIG. 2, local invariant features of a query image are maintained as a list of inverted indices 110, which in turn includes virtual inverted indices 112, 114 and eventually ending at leaves 116. The histogram is applied to candidate image list 120.

This sparse BoW histogram is utilized to retrieve similar images efficiently, i.e., within several hundred milliseconds, from a large image databases. As these retrieved images have category labels, the system can easily generate the tag of the query by weighted voting, which is essentially an approximate nearest neighbor classifier 102. Alternatively, the system can train a supervised linear SVM classifier from these sparse BoW histograms.

The candidate images returned by this retrieval approach tend to be similar only in terms of low-level image contents, e.g., shapes and textures, thus their category tags are probably noisy. Even though, given a large image database with every image tagged, we strive to predict the category of the image to be classified from the tags of the top retrieved images. Towards this end, the system can use two approaches, a weighted voting scheme of top candidate images and SVM training based on the category ranking, which are described in more details below. The SVM approach effectively explores the semantic level connections among different categories using a learning framework.

Turning now to the classification by weighted voting approach, given a rank list of candidate images returned by retrieval and their tags, the system can assign a category index c from in total N categories by a weighted voting of the ranks. For a query image q to be classified, the retrieved top K candidate images $I_i$ are sorted according to their matching score $s_i$ in descending order $\{I_i, s_i\}_1^K$, $s_i > s_j$, $\forall i < j$. Denote $C(I_i)$ as the image category index of $I_i$, then the category of the query image $C(q)$ is determined by $$C(q) = \underset{c=1}{\overset{N}{\operatorname{argmax}}} \sum_{i=1}^{K} \frac{1(C(I_i) = c)}{\sqrt{i}}, \quad (1)$$

where $1(\bullet)$ is the indicator function which is 1 if C(i) and c indicate the same class, otherwise 0. The inverse of the square root of the rank i is employed to penalize images with low matching confidences. We use a validation set to determine K=400. The category with images being ranked at the top of the retrieved images is regarded as the classification result. The image matching scores $s_i$ given by the retrieval output can be also used to weigh the candidate images. However, the absolute values of the matching scores may vary dramatically across different query images (up to 1-2 degrees of order). This issue may affect the consistency of classification scores. Instead, employing the rank i of the candidates as the weights yields more stable performance. This efficient weighted voting procedure is essentially an approximate nearest neighbor classifier which is denoted by W-Voting.

Turning now to the classification by linear SVMs, the weighted voting scheme picks the most likely category by the heuristic in Eq. (1), which does not consider the semantic relation among different categories. In fact, different image categories are not semantically independent but can be organized in a hierarchical tree structure. Categories within a broad concept tend to demonstrate large ambiguity for retrieval algorithms, e.g., many flowers such as sunflower and daisy may appear quite similar, and appearance differences between cat and tiger are subtle to retrieval algorithms. Thus, to take this into consideration, one embodiment employs the ranking scores of all categories to train a multi-class linear SVM to further improve the classification accuracy. Specifically, we concatenate the ranking scores obtained in Eq. (1) to build a feature $x \in R^N$ for an image q, $$x = \left\{ \sum_{i=1}^{K} \frac{1(C(I_i) = c)}{\sqrt{i}} \right\}_{c=1}^{N}. \quad (2)$$

Note when constructing x for training images the original image is in the database which should be excluded from the candidate image list. For a 1000-category classification problem, $x \in R^{1000}$. We denote this method by SVM-Rank which is as efficient as the weighted voting scheme.

Another straightforward way to utilize the retrieval is to train SVMs directly based on the BoW histograms from the tree based descriptor quantization. The hierarchical vocabulary tree typically contains several millions of leaf nodes or visual words. After the tree quantization, conceptually the image is represented by the BoW histograms in an extremely high dimensional feature space, which is not tractable for SVM training. However, since at most several thousands of local features can be detected in one image (we limit up to 2500 features), this BoW histogram is very sparse. Therefore we can efficiently apply random projections to reduce their dimensionality, then train multi-class linear SVM classifiers. This method is denoted by SVM-BoW, which requires more computation and memory compared with SVM-Rank due to the random projection. Although this method yields less satisfactory results in our experiments, we would like share with the community the experience using a BoW representation with several million visual words in image classification.

In sum, a vocabulary tree based image retrieval can conduct fast image category classification. SVM classifiers based on a simple weighted voting scheme according to the ranks of candidate images can achieve surprisingly good performance on the ImageNet Challenge task with 1.26 training images in 1000 categories. The image classification by retrieval method is simple, efficient, effective, and easy to be implemented and repeated, which demonstrates great potential for very large scale image classification tasks in emerging applications such as image tagging and recommendation. In one implementation using a vocabulary tree with 7 layers and branch factor 10, the system can classify one test image to 1K categories in 0.3-0.5 seconds based on 1.26 million training images. In contrast, the state-of-the-art coding algorithms typically require several seconds or minutes to process one image, e.g., both the LCC and super-vector coding approaches need 2-3 seconds using codebooks with 1K to 8K visual words, and the sparse coding may consume minutes to encode one image.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments. Thus, the present invention is not intended to be limited to the embodiments shown herein but is to be accorded the widest scope consistent with the principles and novel features disclosed herein.

What is claimed is:

1. A method to categorize images, comprising:
   detecting local features for each image;
   applying a tree structure to index local features in the images;
   extracting a rank list of candidate images with category tags based on a tree indexing structure to estimate a label of a query image, and
   determining a category of the query image C(q) by $$C(q) = \underset{c=1}{\overset{N}{\operatorname{argmax}}} \sum_{i=1}^{K} \frac{1(C(I_i) = c)}{\sqrt{i}},$$

where retrieved top K candidate images $I_i$ are sorted according to matching score $s_i$ in descending order $\{I_i, s_i\}_1^K$, $s_i > s_j$, $\forall i < j$ and where $C(I_i)$ is an image category index of $I_i$.
wherein the above steps are computer implemented.

2. The method of claim 1, comprising applying a weighted voting according to a rank.

3. The method of claim 1, comprising performing vocabulary tree based image retrieval in a large-scale image category classifier.

4. The method of claim 3, wherein the vocabulary tree based image retrieval comprises determining image content based nearest neighbor searching.

5. The method of claim 3, wherein the vocabulary tree based image retrieval comprises classifying with a linear support vector machine (SVM).

6. The method of claim 1, comprising generating inverted indices representing local invariant feature of an image.

7. The method of claim 1, comprising performing a sematic category classification to generate a semantic label for the query image.

8. A system to categorize images, comprising:
   means for detecting local features for each image;
   means for applying a tree structure to index local features in the images;
   means for extracting a rank list of candidate images with category tags based on a tree indexing structure to estimate a label of a query image, and
   means for determining a category of the query image C(q)

$$C(q) = \underset{c=1}{\overset{N}{\operatorname{argmax}}} \sum_{i=1}^{K} \frac{1(C(I_i) = c)}{\sqrt{i}},$$

where retrieved top K candidate images $I_i$ are sorted according to matching score $s_i$ in descending order $\{I_i, s_i\}_1^K$, $s_i > s_j$, $\forall i < j$ and where $C(I_i)$ is an image category index of $I_i$.
wherein the above means are computer implemented.

9. The method of claim 1, comprising ranking scores of all categories to train a multi-class linear SVM.

10. The method of claim 1, comprising concatenating ranking scores build a feature $x \in R^N$ for an image q:

$$x = \left\{ \sum_{i=1}^{K} \frac{1(C(I_i) = c)}{\sqrt{i}} \right\}_{c=1}^{N}.$$

11. The system of claim 8, comprising means for concatenating ranking scores build a feature $x \in R^N$ for an image q:

$$x = \left\{ \sum_{i=1}^{K} \frac{1(C(I_i) = c)}{\sqrt{i}} \right\}_{c=1}^{N}.$$

12. The system of claim 8, comprising means for applying a weighted voting according to a rank.

13. The system of claim 8, comprising means for performing vocabulary tree based image retrieval in a large-scale image category classifier.

14. The system of claim 8, wherein the vocabulary tree based image retrieval means comprises means for determining image content based nearest neighbor searching.

15. The system of claim 13, wherein the vocabulary tree based image retrieval means comprises means for classifying with a linear support vector machine (SVM).

16. The system of claim 8, comprising means for generating inverted indices representing local invariant feature of an image.

17. The system of claim 8, comprising means for performing a sematic category classification to generate a semantic label for the query image.

18. The system of claim 8, comprising means for ranking scores of all categories to train a multi-class linear SVM.

* * * * *